Dec. 23, 1969  M. P. BLAKE  3,485,062

FLEXIBLE COUPLING

Filed Feb. 26, 1968

INVENTOR.
Michael P. Blake,
BY
Wolfe, Hubbard, Voit & Osann
ATTORNEYS.

United States Patent Office 3,485,062
Patented Dec. 23, 1969

3,485,062
FLEXIBLE COUPLING
Michael P. Blake, c/o Lovejoy, Inc., 1650 Kalamazoo St., South Haven, Mich. 49090
Filed Feb. 26, 1968, Ser. No. 708,395
Int. Cl. F16d 3/64
U.S. Cl. 64—14                                                10 Claims

ABSTRACT OF THE DISCLOSURE

A flexible coupling connecting two end-to-end shafts and comprising two hubs keyed to the shafts, an intermediate spool between the hubs having a series of axially and radially opening notches forming jaws on the ends of the spool, outwardly projecting jaws on the remote ends of the sleeves forming the hub bodies intermeshing loosely with the spool jaws, and a one-piece rubber spider at each end of the spool comprising cushioning pads between the working faces of the jaws, connecting webs between the spool jaws and the hub sleeves, and additional connecting webs between the hub jaws and the end walls of the notches. In the preferred mounting, the hub bodies are entirely within the spool, but each hub is reversible to increase the effective length of the coupling.

BACKGROUND OF THE INVENTION

This invention relates to a flexible coupling for drivingly connecting two shafts disposed in end-to-end relation and transmitting torque between the shafts while cushioning torsional shocks and vibration and accommodating misalinement of the shafts. More particularly, the invention relates to the type of coupling in which two hubs are mounted on the adjacent end portions of the shafts and connected by an intermediate member having jaws intermeshing with similar jaws on the hubs.

SUMMARY OF THE INVENTION

The general object of the present invention is to provide a new and improved coupling of the foregoing character with minimum weight and size and high tolerance to misalinement, exhibiting less lateral vibration and lateral stiffness in use than other known couplings designed for comparable purposes, and having greater endurance in service use than competitive couplings. Another object is to achieve the foregoing in a coupling in which alinement inspection may be accomplished in a rapid and simple operation without disassembling the coupling and which provides a visible indication of wear that may lead to failure. These important advantages are achieved by incorporating in the coupling an intermediate spool member for greater tolerance to lateral misalinement, and locating the power transmitting jaws at the extreme ends of the coupling assembly while minimizing the diameter of the assembly to obtain low jaw velocity and low amplitude of vibration as a result of misalinement.

Other objects, advantages and detailed features of the invention will become apparent from the following description, taken in conjunction with the accompanying drawings.

DETAILED DESCRIPTION

Figure 1:
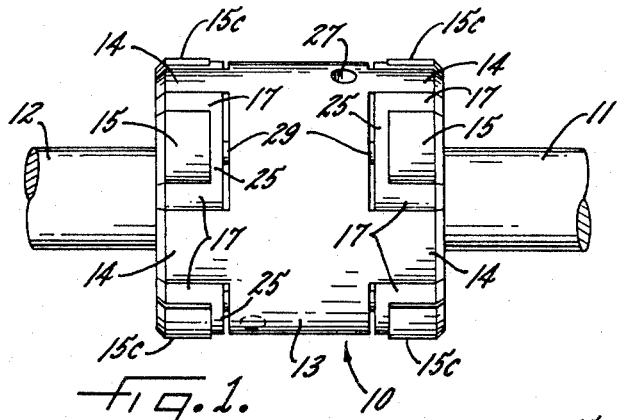
FIG. 1 is a fragmentary side elevational view showing two shafts drivingly connected by a coupling embodying the novel features of the present invention.

As shown in the drawings for purposes of illustration, the invention is embodied in a coupling 10 drivingly connecting two end-to-end shafts 11 and 12 to transmit torque between the shafts while being capable of flexing both angularly and laterally to cushion torsional vibration and shocks while accommodating misalinement of the connected shafts. For example, the shaft 11 may be power driven by a suitable rotary driver (not shown) and the shaft 12 may be driven through the coupling and connected to a driven device. The present coupling is of the so-called double-engagement type with two heads or hubs mountable on the adjacent end portions of the connected shafts for rotation therewith, and an intermediate coupling member 13 disposed between the hubs and yieldably connected to each, herein by means of two sets of angularly spaced jaws 14 on the ends of the intermediate member intermeshing with sets of jaws 15 on the two hubs. Blocks or pads 17 of resiliently compressible material such as rubber are disposed between the intermeshing jaws at each end of the coupling to cushion torque transmission between the driving and driven jaws, and the intermediate member is free to tilt relative to the axis of each shaft and span the gap between the hubs despite any angular or lateral misalinement of these axes, within a limited range, of course. The pads accommodate, by shear, the periodic tangential motion caused by misalinement.

In accordance with the present invention, the power transmitting jaws 14, 15 are spaced apart the full length of the coupling assembly and located at the outside diameter of the assembly for minimum lateral stiffness and optimum tolerance to misalinement in an assembly of compact form that produces vibration of lower amplitude than competitive couplings under similar circumstances. By spacing the jaws apart the full length of the assembly, full advantages is taken of the available length of the coupling for tolerance to misalinement, with the result that a coupling of given length will accommodate greater misalinement without excessive vibration in service use. These factors also reduce the rubbing, wearing or shearing effect on the rubber pads 17 produced by a given amount of shaft misalinement. In short, the invention provides a compact, rugged and lightweight coupling with materially improved performance characteristics.

Figures 3, 5, 6:
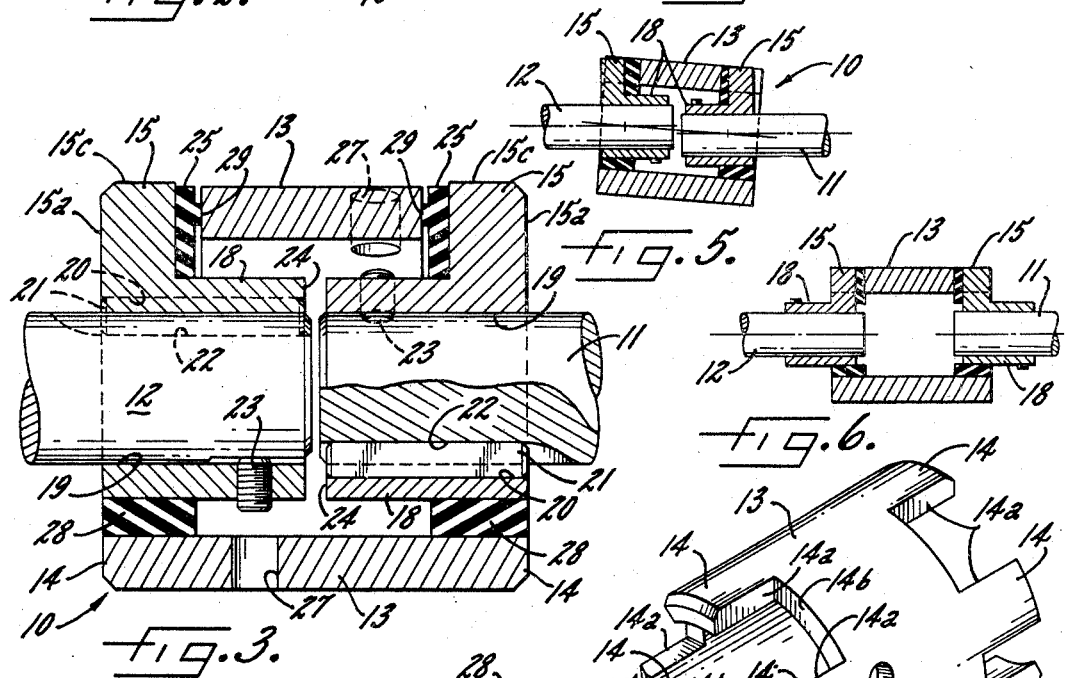
FIG. 3 is an enlarged cross-sectional view taken substantially along the lines 3—3 of FIG. 2.
FIG. 5 is a simplified schematic cross-sectional view illustrating the relationship of the parts as a result of misalinement of the shafts.
FIG. 6 is a view similar to FIG. 5 showing an alternate mounting of the coupling accommodating larger axial separation of the shafts.
Figure 4:
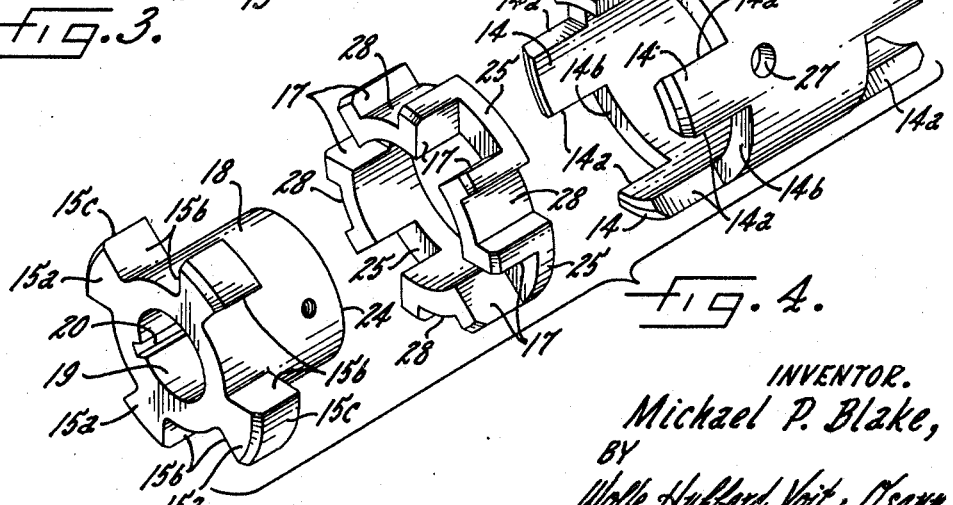
FIG. 4 is an exploded perspective view showing one hub, the spool, and the spider for cushioning engagement between the hub and the spool.

As shown most clearly in FIGS. 3 and 4, each hub comprisesa body 18, preferably of metal such as aluminum, in the form of a hollow sleeve having a center bore 19 sized to telescope over the associated shaft 11, 12 with a close fit and formed on one side with a longitudinal, inwardly opening groove 20 for receiving an elongated key 21 seated in a keyway 22 in the shaft. This key secures the hub to the shaft for rotation therewith, and a set screw 23 threaded through a radial hole in each sleeve (see FIG. 4) is tightened against the shaft to fasten the hub longitudinally in place. An alternate and sometimes preferred arrangement (not shown) is to aline the set screw and the key so that the screw is tightened against the key to avoid marring of the shaft while retaining the key in place.

Figure 2:
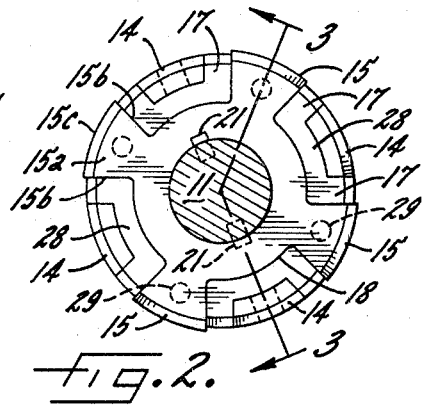
FIG. 2 is an end view of the coupling.

Each of the hubs herein has four integral and equally spaced jaws 15 which project generally radially outwardly from one end of the hub body 18 with end faces 15$^a$ preferably in the same plane as the end of the body and with working faces 15$^b$ on the two sides of each jaw in planes that are parallel to radii of the body, each jaw thus being generally in the form of a truncated wedge (see FIG. 2) joined at its smaller end to the hub body. In the preferred arrangement of the coupling parts, the hubs are telescoped onto the shafts with the jaws 15 at the remote ends of the bodies and the opposite ends 24 of the sleeves close together, as illustrated in FIGS. 3 and 5.

The intermediate member 13 is formed as a hollow sleeve or tubular spool, also preferably composed of metal such as aluminum, having an outside diameter almost as large as the tip diameter of the jaws 15 and an inside diameter substantially greater than the diameter of the hub bodies 18, the jaws 14 being formed integrally with the spool at both ends by flat-sided notches forming axially and radially opening recesses as shown most clearly in FIGS. 1 and 4, there being four such notches at each end in the illustrative spool. Each notch has sidewalls 14$^a$ disposed in spaced longitudinal planes generally parallel to radii of the spool and to the adjacent sidewalls 15$^b$ of the hub jaws 15 when the coupling is assembled, and also has an end wall 14$^b$ in a perpendicular or diametrical plane. The circumferential width of each notch is sufficient to receive a hub jaw with a cushion pad 17 snugly fitted on each side of the jaw, and the longitudinal depth of the notch is greater than the depth of the hub jaw to provide space for rubber web 25 between the jaw and the end wall 14$^b$. Two access holes 27 are drilled in the spool in selected locations to admit a tool (not shown) for tightening and loosening the set screws 23 during installation and removal of the coupling.

The firmness of the rubber used for the cushioning pads 17 may be varied for different degrees of desired stiffness of the coupling, according to standards well known to those skilled in the art. In this instance, each pad is connected integrally to an adjacent pad in the same spool notch by one of the webs 25 extending along the end walls 14$^a$ disposed in spaced longitudinal planes generally (on the opposite side of the adjacent spool jaw) by an arcuate web 28 (see FIGS. 2 and 4) extending into the inner edge portions of the pads along the inside of the spool jaw. The webs 17 preferably are narrower than the width of the space between the hub jaws and the end walls 14$^b$ and are formed with integral spacer projections 29 (FIGS. 1 and 3) which serve to position the metal parts firmly but yieldably relative to each other, while the thickness of the webs 28 is the same as the radial spacing between the hub body 18 and the inner side of the spool 13, thereby forming a continuous spider preventing loss of the cushioning pads as a result of centrifugal force. Thus, it will be seen that the pads and the webs are joined together into a one-piece rubber spider at each end of the coupling holding the metal parts in the desired positions but capable of yielding resiliently in compression to accommodate the relative motions that occur in service use.

For optimum compactness, the hubs are of the shortest practical length commensurate with the size of the shafts to be connected and good design practice with respect to the keys 21, 1–1.2 times the shaft diameter being recommended as a minimum. With the hubs disposed inside the spool 13, the overall length of the coupling is held to a minimum, that is, to the length of the spool itself, and substantially all of the length is used as effective tilting length of the spool. If, however, a longer coupling is required because of a greater axial separation of two shafts to be connected (see FIG. 6), it is possible to reverse either one or both of the hubs to accommodate this increased separation, the fully "open" condition of the coupling being illustrated in FIG. 6. In the half-open condition (not shown), one hub body 18 is inside the spool and the other is outside. The torque-transmitting elements of the reversible hubs and the spool remain in the same relative positions in all of these conditions, and only the total length changes according to the needs of the particular installation.

The schematic illustration in FIG. 5 shows the manner of tilting of the spool 13 to accommodate shaft misalinement, vertical in this instance. The position of the hubs is determined entirely by the positions of the shafts 11 and 12, and spool assumes an inclined position as permitted by resilient yielding of the spider. In addition to the primary operational advantages of the coupling, it will be evident that wear on the spider is visible while the coupling is assembled, that the coupling will continue to operate even after there has been a failure of the spider, and that the spool does not enshroud the hub jaws 15 to prevent alinement checks from the outside while the coupling is assembled. In this respect, it will be seen that the arcuate tips 15$^c$ of the hub jaws are disposed on a diameter slightly greater than the spool diameter so as to project outwardly far enough to permit an alinement check with a straight edge laid on one tip and spanning two jaws at opposite ends of the coupling. A few thousandths of an inch projection is sufficient for this purpose.

From the foregoing, it should be apparent that the present invention provides a new and improved coupling 10 of the so-called double-engagement type that takes full advantage of the available length of the coupling to minimize deflection and resistance thereto in connecting two misalined shafts. At the same time, the outside diameter of the coupling is maintained small for optimum compactness without sacrificing performance. Moreover, the hubs are reversible to increase the effective length, where required, for increased versatility, without effect on the performance of the coupling. It has been observed that this coupling has a lower lateral stiffness than other competitive models, has a much greater tolerance to misalinement, while producing less lateral vibration when running with a given amount of misalinement.

I claim as my invention:

1. A flexible coupling for drivingly connecting two shafts disposed in end-to-end relation, said coupling comprising a pair of side-by-side cylindrical sleeves having center bores for receiving the adjacent end portions of the shafts to be coupled, a hollow tubular coupling spool telescoped loosely over and surrounding said sleeves with the opposite ends of said spool even with the remote ends of the sleeves, said spool having a series of angularly spaced notches in each of its ends defining a plurality of angularly spaced axially projecting spool jaws, angularly spaced jaws on said sleeves at said remote ends projecting generally radially outwardly therefrom into said notches and interfitting with said spool jaws, said sleeve jaws being sized to leave spaces between the notch walls and the sides of the sleeve jaw, first resiliently flexible cushioning elements disposed in and filling the spaces between said jaws to transmit torque between said sleeves and said spool, and resiliently flexible webs connecting said cushioning elements under each of said spool jaws and between each sleeve jaw and the closed end of the associated notch thereby to hold said spool jaws in spaced relation with said sleeve jaws and said sleeves.

2. A flexible coupling for drivingly connecting two shafts disposed in end-to-end relation, said coupling comprising a pair of side-by-side hubs adapted to be telescoped onto and coupled to the adjacent end portion of a shaft, a hollow tubular spool telescoped loosely over said hubs and having opposite end portions overlying the respective hubs, a series of angularly spaced and axially projecting jaws formed on each end of said spool and defining an annular series of axially and radially opening recesses extending around each of said hubs, a plurality of angularly spaced jaws around one end of each hub, the jaws of each hub projecting radially outwardly therefrom into the recesses overlying the hub and interfitting loosely with the spool jaws defining said recesses, and resilient means for transmitting torque between said hubs and said spool.

3. A flexible coupling as defined in claim 2 in which each of said hubs includes a sleeve adapted to telescope onto a shaft, length of the sleeves being approximately equal to one-half the length of said spool, including said spool jaws, whereby the ends of said spool jaws may be generally alined with the remote ends of said hubs while the latter are substantially within the spool.

4. A flexible coupling as defined in claim 2 in which each hub comprises a cylindrical sleeve less than one-half the axial length of said spool with said hub jaws projecting outwardly from one end of each sleeve, said sleeves being disposed entirely within said spool with said hub jaws intermeshing with said spool jaws, and the opposed faces of adjacent jaws beng substantially parallel to each other.

5. A flexible coupling as defined in claim 2 in which said hub jaws extend outwardly to the outside surface of said spool.

6. A flexible coupling as defined in claim 5 in which said hub jaws have tips spaced outwardly from said outside surface.

7. A flexible coupling as defined in claim 3 in which said hub jaws are narrower than the circumferential width of said recesses, and said resilient means comprise pads of resiliently compressible and shearable material disposed on opposite sides of each of the hub jaws to transmit torque between said spool and said hubs.

8. A flexible coupling as defined in claim 7 in which the pads on opposite sides of each hub jaw are integrally joined by a web of said resiliently compressible material disposed between the jaw and the end wall of the recess.

9. A flexible coupling as defined in claim 8 in which the pads on opposite sides of each spool jam are integrally joined by a web of said resiliently compressible material disposed between said spool jaw and the sleeve of the adjacent hub, whereby said pads and said webs form a one-piece spider yieldably positioning said sleeve and said hubs relative to each other.

10. A flexible coupling as defined in claim 3 in which said hubs are reversible on said shaft for mounting of said sleeves either within or outside said spool to change the effective length of the coupling.

References Cited

UNITED STATES PATENTS

| | | | |
|---|---|---|---|
| 2,157,996 | 5/1939 | Brownstein | 64—14 |
| 2,620,640 | 12/1952 | Bales | 64—14 |
| 3,396,556 | 8/1968 | Giegerich | 64—14 |

HALL C. COE, Primary Examiner